(12) United States Patent
Lee et al.

(10) Patent No.: US 10,497,910 B2
(45) Date of Patent: Dec. 3, 2019

(54) BATTERY MODULE

(71) Applicant: LG CHEM, LTD., Seoul (KR)

(72) Inventors: Jong-Young Lee, Daejeon (KR);
Jun-Yeob Seong, Daejeon (KR);
Gang-U Lee, Daejeon (KR); Dal-Mo Kang, Daejeon (KR)

(73) Assignee: LG CHEM, LTD., Seoul (KR)

(*) Notice: Subject to any disclaimer, the term of this patent is extended or adjusted under 35 U.S.C. 154(b) by 734 days.

(21) Appl. No.: 14/915,775

(22) PCT Filed: Jul. 21, 2015

(86) PCT No.: PCT/KR2015/007577
§ 371 (c)(1),
(2) Date: Mar. 1, 2016

(87) PCT Pub. No.: WO2016/017983
PCT Pub. Date: Feb. 4, 2016

(65) Prior Publication Data
US 2016/0233465 A1 Aug. 11, 2016

(30) Foreign Application Priority Data

Jul. 31, 2014 (KR) .................. 10-2014-0098590
Dec. 4, 2014 (KR) .................. 10-2014-0173288

(51) Int. Cl.
*H01M 2/10* (2006.01)
*H01M 10/48* (2006.01)
(Continued)

(52) U.S. Cl.
CPC ......... *H01M 2/1077* (2013.01); *H01M 2/206* (2013.01); *H01M 10/48* (2013.01);
(Continued)

(58) Field of Classification Search
CPC ..................... H01M 2/1016–10188
See application file for complete search history.

(56) References Cited

U.S. PATENT DOCUMENTS 8,647,762 B2    2/2014   Schwab et al.
9,543,555 B2    1/2017   Park et al.
(Continued)

FOREIGN PATENT DOCUMENTS

CN    102142575 A    8/2011
CN    103326082 A    9/2013
(Continued)

OTHER PUBLICATIONS

International Search Report (PCT/ISA/210) issued in PCT/KR2015/007577, dated Sep. 30, 2015.
Machine Translation of JP 2014-110219 A.

*Primary Examiner* — Stephan J Essex
(74) *Attorney, Agent, or Firm* — Birch, Stewart, Kolasch & Birch, LLP

(57) ABSTRACT

Disclosed is a battery module which may have a simple structure, be advantageous in making a small and light design, have excellent assembly and be strong against impact or vibration, by removing or decreasing coupling components for coupling cartridges. The battery module includes a plurality of pouch-type secondary batteries arranged in a lateral direction to stand in a vertical direction, a plurality of cartridges configured to accommodate the pouch-type secondary batteries in an inner space thereof, the cartridges being stacked in a lateral direction, and a housing provided to at least one of front and rear ends of the cartridges and coupled and fixed to at least two cartridges.

18 Claims, 6 Drawing Sheets

(51) Int. Cl.
*H01M 2/20* (2006.01)
*H01M 2/30* (2006.01)
*H01M 10/42* (2006.01)

(52) U.S. Cl.
CPC .... *H01M 2/305* (2013.01); *H01M 2010/4278* (2013.01); *H01M 2220/20* (2013.01)

(56) References Cited

U.S. PATENT DOCUMENTS

| | | | |
|---|---|---|---|
| 2006/0251960 | A1 | 11/2006 | Yoon et al. |
| 2010/0021802 | A1* | 1/2010 | Yang .................. H01M 2/0212 429/91 |
| 2010/0136420 | A1 | 6/2010 | Shin et al. |
| 2011/0059347 | A1 | 3/2011 | Lee et al. |
| 2013/0280565 | A1 | 10/2013 | Lee et al. |
| 2014/0234691 | A1 | 8/2014 | Lee et al. |
| 2015/0093608 | A1 | 4/2015 | Seong et al. |
| 2015/0155533 | A1* | 6/2015 | Kim ....................... H01M 2/30 429/99 |

FOREIGN PATENT DOCUMENTS

| | | | | |
|---|---|---|---|---|
| EP | 2597698 | A1 | 5/2013 | |
| JP | 2014-110219 | A | 6/2014 | |
| KR | 10-2006-0110580 | A | 10/2006 | |
| KR | 10-2012-0051237 | A | 5/2012 | |
| KR | 10-1145719 | B1 | 5/2012 | |
| KR | 10-2013-0008142 | A | 1/2013 | |
| KR | 10-2013-0086678 | A | 8/2013 | |
| KR | 10-2014-0076857 | A | 6/2014 | |
| WO | WO-2012064160 | A2 * | 5/2012 | .......... H01M 2/0207 |
| WO | WO-2013111959 | A1 * | 8/2013 | ........ H01M 10/5016 |
| WO | WO 2014/027783 | A1 | 2/2014 | |

* cited by examiner

BATTERY MODULE

TECHNICAL FIELD

The present disclosure relates to a battery including at least one secondary battery, and more particularly, to a battery module which has a small number of components, a simple structure, small volume and weight, excellent assembly and strong resistance against impact or vibration, and a battery pack and vehicle including the battery module.

The present application claims the benefit of Korean Patent Application No. 10-2014-0098590 filed on Jul. 31, 2014 and Korean Patent Application No. 10-2014-0173288 filed on Dec. 4, 2014 with the Korean Intellectual Property Office, the disclosure of which is incorporated herein by reference in its entirety.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and an negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can type secondary battery where the electrode assembly is included in a metal can and a pouch type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. When being used for middle-sized or large-sized devices, a great number of secondary batteries are electrically connected to enhance capacity and output. In particular, in middle-sized or large-sized devices, pouch-type secondary batteries are frequently used since they are easily stacked and have light weight.

However, a pouch-type secondary battery does not have great mechanical rigidity and not easily maintains its stacked state since it is generally packaged with a battery case made of a laminate sheet of aluminum and polymer. Therefore, when configuring a battery module including a plurality of pouch-type secondary batteries, a cartridge is frequently used to protect the secondary batteries from external impacts or the like, prevent fluctuation of the secondary batteries and facilitate easier stacking of the secondary batteries.

A cartridge generally has a tetragonal plate shape with a hollow center, and at this time, its four side portions are configured to surround peripheral edges of a pouch-type secondary battery. In addition, a plurality of cartridges may be stacked to configure a battery module, and a secondary battery may be located in a vacuum space formed among the stacked cartridges.

However, if a battery module is composed using such cartridges or the like, a coupling component for fixing the cartridges is required. In other words, when a battery module is configured using a plurality of secondary batteries and a plurality of cartridges, coupling components for fixing them to each other, such as bolts, belts or screws, should be provided. In addition, in this case, the cartridge should have a configuration for the coupling with the coupling component, for example a hole or the like. In addition, in case of an existing battery module, end plates are provided at both outermost ends thereof in a stacking direction of the cartridges to ensure rigidity enough to fasten the coupling component.

However, such an existing battery module requires many coupling components, which results in complicated processes and structure and also bad price competitiveness. In addition, the battery module may not include many coupling components due to its limited space or processes, and when a vibration or impact occurs in such a configuration, the stress may be focused to the coupling component, which may cause the coupling component or a portion coupled thereto to be easily damaged. In addition, since such an existing battery module has great volume and weight due to coupling components and relevant configurations, it may be not easy to design a battery module with a small size and a light weight.

DISCLOSURE

Technical Problem

The present disclosure is designed to solve the problems of the related art, and therefore the present disclosure is directed to providing a battery module which may have a simple structure, be advantageous in making a small and light design, have excellent assembly and be strong against impact or vibration, by removing or decreasing coupling components for coupling cartridges when configuring a battery module, and a battery pack and vehicle including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, which includes a plurality of pouch-type secondary batteries arranged in a lateral direction to stand in a vertical direction; a plurality of cartridges configured to accommodate the pouch-type secondary batteries in an inner space thereof, the cartridges being stacked in a lateral direction; and a housing provided to at least one of front and rear ends of the cartridges and coupled and fixed to at least two cartridges.

Here, the housing may include an upper housing coupled and fixed to an upper portion of at least one of front and rear ends of the cartridge; and a lower housing coupled and fixed to a lower portion of at least one of front and rear ends of the cartridge.

In addition, the upper housing and the lower housing may be coupled and fixed to each other by hooking.

In addition, coupling holes may be formed in the upper housing and the lower housing in a vertical direction, and a coupling member may be inserted through both the coupling holes.

In addition, the housing may have a coupling protrusion formed at an inner side, which is coupled to the cartridges, to protrude inwards, at least two cartridges among the plurality of cartridges may have coupling grooves formed in outer sides to have a shape corresponding to the coupling protrusion, and the housing may be coupled to the cartridges by inserting the coupling protrusion into the coupling groove.

In addition, the coupling protrusion may have a portion which becomes thicker as being closer to the cartridge, the coupling groove may have a portion which becomes thicker as being closer to the inner side, and the coupling protrusion may be slidably coupled into the coupling groove in a vertical direction.

In addition, in at least two cartridges among the plurality of cartridges, the coupling grooves may be respectively formed to a predetermined depth in a vertical direction at both upper and lower ends of the cartridges.

In addition, at least a part of the plurality of cartridges may have the coupling groove at a front or rear end thereof.

In addition, cartridges having coupling grooves formed at front ends thereof and cartridges having coupling grooves at rear ends thereof may be arranged alternately.

In addition, the housing may be provided to both front and rear ends of the cartridge.

In addition, an electrode lead of the pouch-type secondary battery may be provided to at least one of front and rear ends of the cartridge, and the housing may include a bus bar located at an inner side thereof to electrically contact the electrode lead, and a module terminal formed to protrude on an outer side thereof and electrically connected to the bus bar.

In addition, the housing may include a connector terminal configured to sense a voltage of the pouch-type secondary battery and transmit the sensed information to the outside.

In addition, at least a part of the pouch-type secondary battery may be adhered and fixed to the cartridge by means of an adhesive.

In addition, two pouch-type secondary batteries adjacent to each other may be adhered and fixed to a single cartridge.

In addition, at least a part of the cartridge may include a thermally-conductive polymer or include a thermally-conductive material containing thermally-conductive filler and polymer.

In another aspect of the present disclosure, there is also provided a battery pack, which includes the battery module according to the present disclosure.

In another aspect of the present disclosure, there is also provided a vehicle, which includes the battery module for a secondary battery according to the present disclosure.

Advantageous Effects

In an embodiment of the present disclosure, it is possible to simplify the structure of a battery module, reduce volume and weight, and improve processes in manufacture.

In particular, according to an embodiment of the present disclosure, when configuring a battery module by stacking a plurality of cartridges, cartridge coupling components such as bolts or screws may not be used, and the cartridges may be coupled using a housing which is commonly coupled to the plurality of cartridges.

Therefore, according to the above configuration of the present disclosure, cartridge coupling components such as bolts or screws may be removed or decreased. In addition, the cartridge may not have holes for inserting such bolts or screws therein, and also it is not needed to provide end plates or the like to both ends of the cartridge in a stacking direction.

For this reason, according to the above configuration of the present disclosure, the battery module may have an uncomplicated structure, ensure easy assembly and reduce manufacture time and costs. In addition, the battery module may be have a smaller design more easily by reducing the volume of the battery module, and the battery module may also have a lighter design by reducing the weight of the battery module.

In addition, according to the above configuration of the present disclosure, when an impact or vibration is applied to the battery module during manufacture or use, it is prevented that stress is focused to a predetermined coupling component, and thus it is possible to prevent the corresponding coupling component or a portion coupled thereto from be damaged.

In addition, according to an embodiment of the present disclosure, a secondary battery may be directly adhered and fixed to the cartridge, and also, two secondary batteries adjacent to each other may be adhered and fixed to a single cartridge.

Therefore, according to an embodiment of the present disclosure, a coupling force between cartridges or between a secondary battery and a cartridge may be more improved through an adhesive without any cartridge coupling component.

In addition, according to an embodiment of the present disclosure, since the cartridge includes thermally-conductive material such as thermally-conductive plastic or rubber, it is possible to fix and cool the secondary battery just with the cartridge.

Therefore, according to an embodiment of the present disclosure, it is not required to separately provide a cooling member such as a cooling plate between secondary batteries. For this reason, the space occupied by such a cooling member and any configuration for fixing such a cooling member may be eliminated or reduced, and thus it is easy to design a compact battery module.

Further, according to an embodiment of the present disclosure, since at least a part of the secondary battery is fixed to the cartridge by means of direct contact, a distance for heat transfer between the cartridge and the secondary battery is short, and the air may not be present in the heat transfer path, which may further improve the cooling performance.

DESCRIPTION OF DRAWINGS

The accompanying drawings illustrate a preferred embodiment of the present disclosure and together with the foregoing disclosure, serve to provide further understanding of the technical feature of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
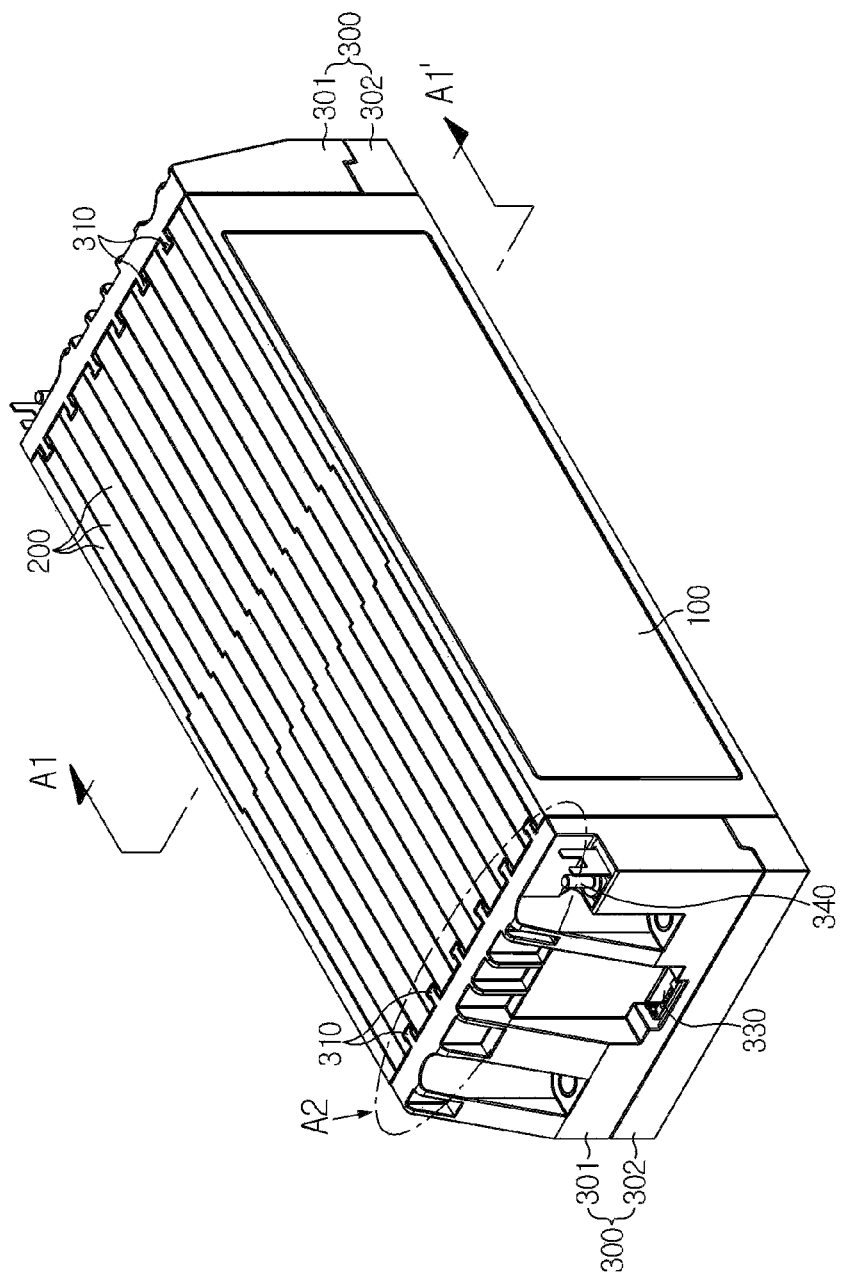
FIG. 1 is a perspective view schematically showing a battery module according to an embodiment of the present disclosure.
Figure 2:
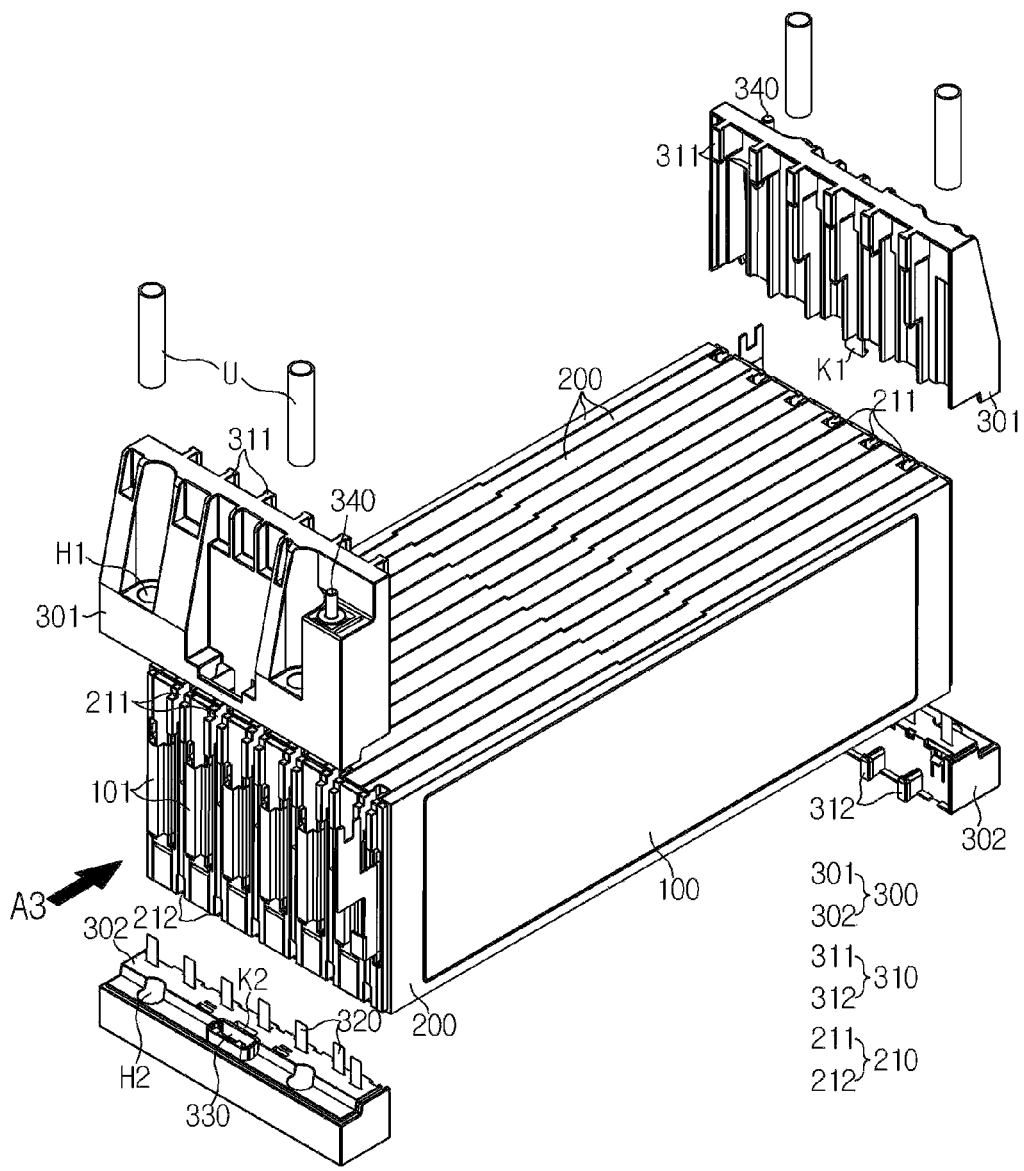
FIG. 2 is a perspective view showing the battery module of FIG. 1, from which a housing is separated.
Figure 3:
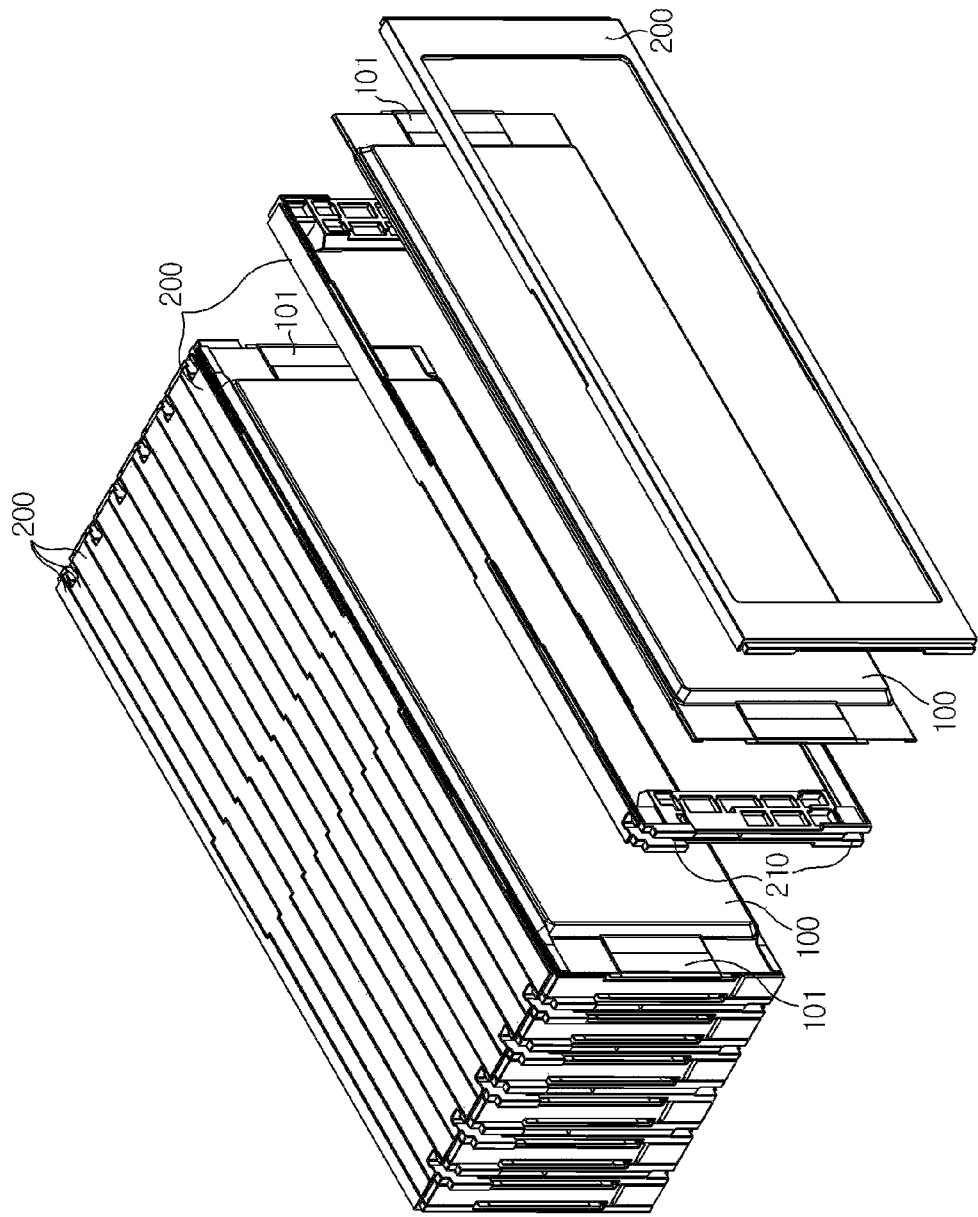
FIG. 3 is a perspective view showing the battery module of FIG. 1, from which the housing is excluded and a stacked configuration of secondary batteries and cartridges is partially separated.
Figure 4:
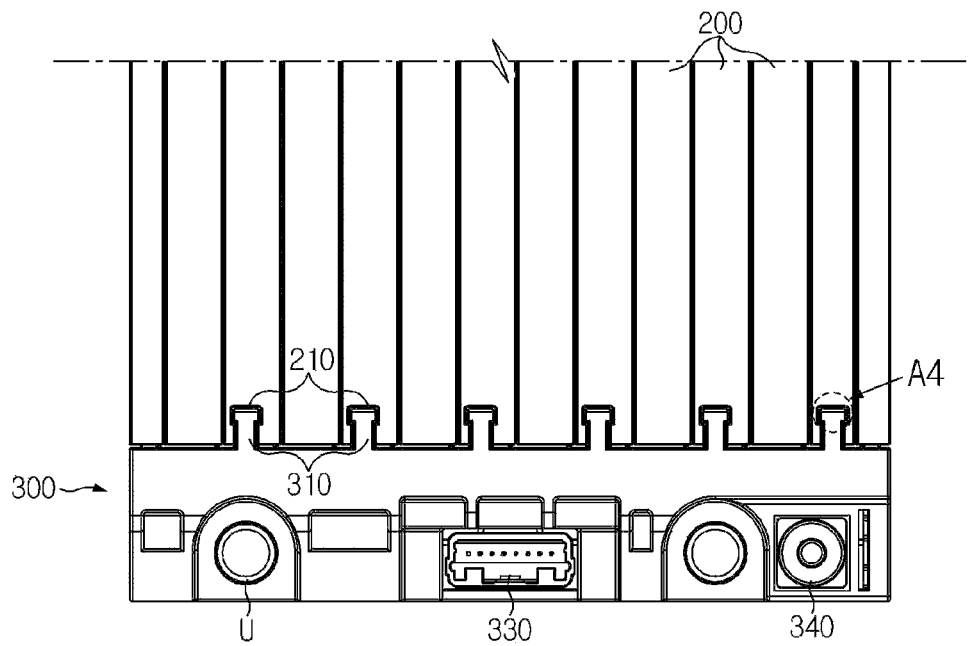
FIG. 4 is a diagram showing a front end of the battery module of FIG. 1, which is observed from the above.

FIG. 1 is a perspective view schematically showing a battery module according to an embodiment of the present disclosure. In addition, FIG. 2 is a perspective view showing the battery module of FIG. 1, from which a housing is separated, and FIG. 3 is a perspective view showing the battery module of FIG. 1, from which the housing is excluded and a stacked configuration of secondary batteries and cartridges is partially separated. Also, FIG. 4 is a diagram showing a front end (Portion A2) of the battery module of FIG. 1, which is observed from the above.

Referring to FIGS. 1 to 4, a battery module according to the present disclosure includes a secondary battery 100, a cartridge 200 and a housing 300.

A plurality of secondary batteries 100 may be provided to a single battery module. In particular, each of the plurality of secondary batteries may be a pouch-type secondary battery. The pouch-type secondary battery 100 may include an electrode assembly, an electrolyte and a pouch exterior.

Here, the electrode assembly may be configured so that at least one positive electrode plate and at least one negative electrode plate are arranged with a separator being interposed therebetween. In more detail, the electrode assembly may be classified into a rolling type in which a single positive electrode plate and a single negative electrode plate are rolled together with a separator, and a stacking type in which a plurality of positive electrode plates and a plurality of negative electrode plates are alternately stacked with a separator being interposed therebetween.

In addition, a pouch exterior may be configured to have an outer insulation layer, a metal layer and an inner adhesive layer. The pouch exterior may be configured to protect inner components such as the electrode assembly and the electrolyte and to include a metal film, for example an aluminum film, in order to supplement electric and chemical properties of the electrode assembly and the electrolyte and improve heat resistance. In addition, the aluminum film may be interposed between insulation layers made of insulating material in order to ensure electric insulation from inner components of the secondary battery 100, such as the electrode assembly and the electrolyte, and other components out of the secondary battery 100.

In particular, the pouch exterior may be composed of two pouches, and at least one of them may have a concave inner space. In addition, the electrode assembly may be accommodated in the inner space of the pouch. Moreover, sealing portions are provided at peripheral edges of two pouches so that the sealing portions are welded to each other to seal the inner space in which the electrode assembly is accommodated.

Meanwhile, an electrode tab is provided to each electrode plate of the electrode assembly, and at least one electrode tab may be connected to an electrode lead 101. In addition, the electrode lead 101 may be interposed between sealing portions of two pouches and exposed out of the pouch exterior, thereby serving as an electrode terminal of the secondary battery 100.

The battery module according to an embodiment of the present disclosure may adopt pouch-type secondary batteries of various shapes, known to the public at the time of filing of this application.

The pouch-type secondary batteries 100 may be arranged in a horizontal direction to stand in a vertical direction, respectively. For example, assuming that a protruding side of the electrode lead 101 is a front side of the battery module in the configuration of FIG. 2, if the battery module is observed from the front side of the battery module, a plurality of pouch-type secondary batteries 100 may be arranged in a lateral direction to stand vertically so that their broad surfaces face the right and left sides.

In other words, in the battery module according to the present disclosure, the pouch-type secondary battery 100 may be configured to have a standing shape so that two broad surfaces respectively face right and left sides, and sealing portions are located at upper, lower, front and rear sides thereof. In addition, the pouch-type secondary batteries 100 having a standing shape as described above may be arranged in parallel in a lateral direction so that their broad surfaces face each other.

Meanwhile, in the present disclosure, front, rear, right, left, upper and lower directions are classified based on the case that the battery module is observed from a front side, which is a side where the electrode lead 101 protrudes, unless otherwise noted. In other words, in the configuration of FIG. 2, based on the case that the battery module is observed in a direction indicated by an arrow A3, front, rear, right, left, upper and lower directions are classified.

The cartridge 200 may accommodate the pouch-type secondary batteries 100 in the inner space to protect the outer sides of the pouch-type secondary batteries 100, guide arrangement of the pouch-type secondary batteries 100, and prevent the stacked assembly from shaking.

In addition, the cartridges 200 may be configured to be stacked. For example, as shown in FIGS. 1 to 4, the cartridges 200 may be stacked in a direction identical to the stacking direction of the secondary batteries 100, namely in a lateral direction.

Here, the cartridges 200 may have uneven structures which are formed at contacting surfaces when being stacked, namely right and left surfaces to have corresponding shapes.

In this embodiment of the present disclosure, due to the uneven structures of the cartridges 200, the cartridges 200 may be coupled and fixed more strongly, and the cartridges 200 may also be assembled more easily since the uneven structures serve as a guide.

Figure 5:
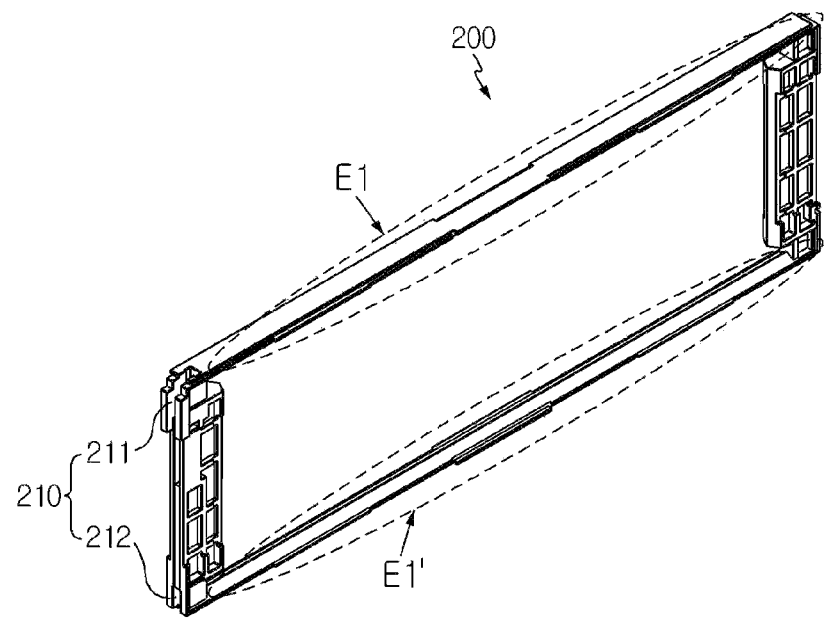
FIG. 5 is a perspective view schematically showing a cartridge 200 according to an embodiment of the present disclosure.

FIG. 5 is a perspective view schematically showing the cartridge 200 according to an embodiment of the present disclosure.

Referring to FIG. 5, the cartridge 200 may have a rectangular ring shape. In this case, the cartridge 200 may be configured with four unit frames, which are mutually connected at both ends thereof. Generally, since the pouch-type secondary battery 100 has an approximately rectangular shape, the cartridge 200 may have a rectangular ring shape to surround the peripheral edges of the pouch-type secondary battery 100. At this time, the cartridge 200 may be prepared by fabricating unit frames separately and then assembling the unit frames, or may be prepared in an integrated form from the beginning.

In this configuration, the cartridge 200 may be formed to have an empty center, and the pouch-type secondary battery 100 may be accommodated in the inner space of the empty center. In other words, the pouch-type secondary battery 100 may be located in the inner space defined by the unit frames of the cartridge 200. Also, when the cartridges 200 are stacked, the pouch-type secondary battery 100 may be located in the inner space formed by the stacked cartridges, and its outer side may be at least partially covered.

The housing 300 is provided to at least one side of the cartridge 200 and may be coupled and fixed to at least two cartridges 200. In particular, the housing 300 may be located at a front end and/or a rear end of the cartridge 200, instead of both ends of the cartridge 200 in a stacking direction. In other words, in the configuration depicted in FIG. 2, when being observed in a direction of A3, the housing 300 may be mounted to a front end and/or a rear end of the battery module, instead of a right or left side thereof.

The housing 300 may be located at a front end and/or a rear end of the cartridge 200 as described above and be coupled and fixed to the front end and/or the rear end of the cartridge 200. In particular, the housing 300 may be coupled and fixed to at least two cartridges 200 so that at least two cartridges 200 are mutually coupled. At this time, the housing 300 may be coupled and fixed to a plurality of cartridges 200 spaced apart from each other so that a cartridge 200 interposed between the cartridges 200 may be fixed together.

Preferably, the housing 300 may include an upper housing 301 and a lower housing 302.

The upper housing 301 may be coupled and fixed to the cartridge 200 at a side upper portion of at least one of the front and rear ends of the cartridge 200. In addition, the lower housing 302 may be coupled and fixed to the cartridge 200 at a side lower portion of at least one of the front and rear ends of the cartridge 200. For example, as shown in FIG. 2, both the upper housing 301 and the lower housing 302 may be mounted to the front end (marked with A3) of the battery module.

Here, the upper housing 301 may be placed on the top of the lower housing 302. For this, the lower surface of the upper housing 301 and the upper surface of the lower housing 302 may be formed to have corresponding shapes.

In addition, the upper housing 301 and the lower housing 302 may have a configuration for mutual coupling and fixing.

Representatively, the upper housing 301 and the lower housing 302 may be coupled and fixed by means of hooking.

In particular, a hooking mechanism may be provided at the bottom of the upper housing 301 and the top of the lower housing 302 at corresponding locations with corresponding shapes, and when the upper housing 301 is placed on the lower housing 302, the hooking mechanism may be coupled to each other.

For example, as indicated by K1 in FIG. 2, the upper housing 301 may have a hook protruding downwards at a lower end thereof. In addition, the lower housing 302 may have a hook groove with a location and shape corresponding to those of to the hook. For example, as indicated by K2 in FIG. 2, the lower housing 302 may have a downwardly concave hook groove formed at an upper end thereof. In the above configuration of the present disclosure, the upper housing 301 and the lower housing 302 may be coupled and fixed to each other in a simple way, and it is possible to prevent the upper housing 301 and the lower housing 302 from being separated.

In addition, the upper housing 301 and the lower housing 302 may be coupled and fixed to each other by means of a single coupling member. For example, as indicated by H1 in FIG. 2, the upper housing 301 may have a coupling hole formed in at least one side thereof to penetrate in a vertical direction. In addition, as indicated by H2, the lower housing 302 may also have a coupling hole in a vertical direction at a location corresponding to the coupling hole H1 of the upper housing 301. In this case, as indicated by U in FIG. 2, a coupling member such as a bushing or bolt may be inserted through the coupling hole H1 of the upper housing 301 and the coupling hole H2 of the lower housing 302, thereby allowing the upper housing 301 and the lower housing 302 to be fixed to each other and thus not to be separated from each other.

As described above, the upper housing 301 and the lower housing 302 are coupled and fixed to each other and provided at one side of the cartridge 200, thereby covering the corresponding side surface of the cartridge 200 entirely. For example, if the upper housing 301 and the lower housing 302 are provided at a front end of the cartridge 200, the front end of the cartridge 200 may be entirely covered by the upper housing 301 and the lower housing 302 and not exposed outwards.

In the battery module according to an embodiment of the present disclosure, housings may be provided at both the front end and the rear end of the cartridge 200.

In other words, as shown in FIGS. 1 and 2, a housing may be provided at the front end of the cartridge 200 and coupled and fixed to the front end of the cartridge 200, and also a housing may be provided at the rear end of the cartridge 200 to be coupled and fixed to the rear end of the cartridge 200. In particular, the housing may include an upper housing 301 and a lower housing 302, similar to the former embodiment, and in this case, two upper housings 301 and two lower housings 302 may be provided respectively and coupled to both the front end and the rear end of the cartridge 200.

In this embodiment of the present disclosure, since the cartridge 200 included in the battery module is coupled and fixed by the housings at both the front end and the rear end thereof, the stacking structure of the cartridges 200 may be maintained stably and firmly as a whole.

Also preferably, the housing 300 may be coupled and fixed to the cartridge 200 by means of protrusion-groove coupling.

For example, as shown in FIGS. 2 and 4, the housing may include a coupling protrusion 310 which protrudes inwards. For example, the housing located at the front end of the cartridge 200 may have the coupling protrusion 310 which is formed to protrude rearwards at a side of the housing where the cartridge 200 is located, namely at an inner side of the housing.

In this case, at least a part of the plurality of cartridges 200 may have a coupling groove 210 formed at a side of the cartridges where the housing is coupled, with a shape corresponding to the coupling protrusion 310, as shown in FIGS. 2, 4 and 5. For example, if the housing is located at the front end of the cartridge 200, the cartridge 200 may have a coupling groove 210 formed at the front end thereof.

Therefore, in this configuration of the present disclosure, as shown in FIGS. 1 and 4, as the coupling protrusion 310 of the housing may be inserted into the coupling groove 210 of the cartridge 200, the housing and the cartridge 200 may be coupled and fixed to each other.

Here, the coupling protrusion 310 formed at the housing may have a portion which becomes thicker as being closer to the cartridge 200. In addition, the coupling groove 210 may have a portion which becomes thicker as being closer to the inner side at an open end, so as to correspond to the shape of the coupling protrusion 310. For example, as indicated by A4 in FIG. 4, the coupling protrusion 310 of the housing may have a greater thickness at its inner end (the upper end in FIG. 4), and the coupling groove 210 may also have a greater thickness at its inner end.

In this configuration of the present disclosure, the coupling protrusion 310 may be inserted and coupled into the coupling groove 210 by sliding in a vertical direction, at an upper or lower end of the coupling groove 210. For example, in the configuration depicted in FIG. 2 where the upper housing 301 is located at the front end of the cartridge 200, since the inner end of the coupling protrusion 310 is thicker than the outer open end of the coupling groove 210, if the upper housing 301 moves in a horizontal direction toward the cartridge 200, the coupling protrusion 310 may not be inserted into the coupling groove 210. However, if the upper housing 301 moves downwards at the upper end of the cartridge 200 in a state where horizontal locations of the coupling protrusion 310 and the coupling groove 210 are matched, the coupling protrusion 310 may be slidably coupled to the coupling groove 210.

In this embodiment of the present disclosure, the housing may be easily coupled to the cartridge 200 by means of sliding. In addition, if the housing is coupled to the cartridge 200, it is possible to prevent the housing from being separated from the cartridge 200 in a horizontal direction, particularly in a front direction. In other words, since the end of the coupling protrusion 310 of the housing is thicker than the open front end of the coupling groove 210 of the cartridge 200, the housing may not be moved or separated out of the front end, in a state of being coupled to the cartridge 200.

More preferably, among the plurality of cartridges 200, at least two cartridges 200 may respectively have coupling grooves 210 at both upper and lower ends thereof to a predetermined depth in a vertical direction. For example, at least a part of the cartridges 200 included in the battery module may have coupling grooves 210 formed at both upper and lower ends thereof, as shown in FIGS. 2 and 5. At this time, the coupling groove 211 at the top may have an open upper end and be formed to a predetermined depth in a downward direction, and the coupling groove 212 at the bottom may have an open lower end and be formed to a predetermined depth in an upward direction.

In this configuration of the present disclosure, the coupling protrusion 311 of the upper housing 301 may be coupled to the coupling groove 211 at the upper end, and the coupling protrusion 312 of the lower housing 302 may be coupled to the coupling groove 212 at the lower end. In other words, the upper housing 301 may be coupled to the cartridge 200 as the coupling protrusion 311 slides downwards at the open upper end of the coupling groove 211 formed at the top. In addition, the lower housing 302 may be coupled to the cartridge 200 as the coupling protrusion 312 slides upwards at the open lower end of the coupling groove 212 formed at the bottom.

In this embodiment of the present disclosure, since both the upper housing 301 and the lower housing 302 are coupled to the cartridge 200, the housing and the cartridge 200 may be coupled and fixed more firmly. In addition, since the upper housing 301 and the lower housing 302 may be coupled at a desired location by using the coupling groove 211 at the top and the coupling groove 212 at the bottom, the upper housing 301 and the lower housing 302 may be coupled more firmly and assembled more easily.

In particular, the coupling groove 210 may be formed to have a height identical to the height of the end of the coupling protrusion 310. In other words, when the housing is placed at a proper location, the coupling protrusion 310 may come into contact with the end of the coupling groove 210. For example, the coupling groove 211 at the top, which is coupled to the coupling protrusion 311 of the upper housing 301, may be formed to have a depth which may come into contact with the lower end of the coupling protrusion 311 when the upper housing 301 is mounted at a proper location. In addition, the coupling groove 212 at the bottom, which is coupled to the coupling protrusion 312 of the lower housing 302, may be formed to have a depth which may come into contact with the upper end of the coupling protrusion 312 when the lower housing 302 is mounted to a proper location.

In this embodiment of the present disclosure, if the coupling protrusion 310 and the coupling groove 210 are coupled, movement of the housing in a vertical direction may be restricted. For example, since the lower end of the coupling protrusion 311 contacts the upper end of the coupling groove 211, the upper housing 301 may not move downwards any more. In addition, since the upper end of the coupling protrusion 312 contacts the lower end of the coupling groove 212, the lower housing 302 may not move upwards any more.

At this time, if the upper housing 301 and the lower housing 302 are not separated from each other in a vertical direction due to hooking or the like, the upper housing 301 and the lower housing 302 may be fixed at a side of the cartridge 200 without moving in a vertical direction.

In addition, as shown in FIGS. 2 and 3, the pouch-type secondary battery 100 may include electrode leads 101, respectively at the front end and the rear end. At this time, each electrode lead 101 may be located at a center of the front and rear peripheral edges of the secondary battery 100. If the coupling groove 211 at the top and the coupling groove 212 at the bottom are formed in the cartridge 200 and also the coupling protrusion 311 of the upper housing and the coupling protrusion 312 of the lower housing are respectively coupled thereto as in this embodiment, it is possible to exclude or reduce an interference between the coupling protrusion 310 and the electrode lead 101. Therefore, the battery module may be assembled more easily, and a space occupied for coupling may be reduced, which may lead to a smaller design of the battery module.

Also preferably, at least a part of the plurality of cartridges 200 included in the battery module according to the present disclosure may have a coupling groove 210 at a front end or a rear end thereof.

Figure 6:
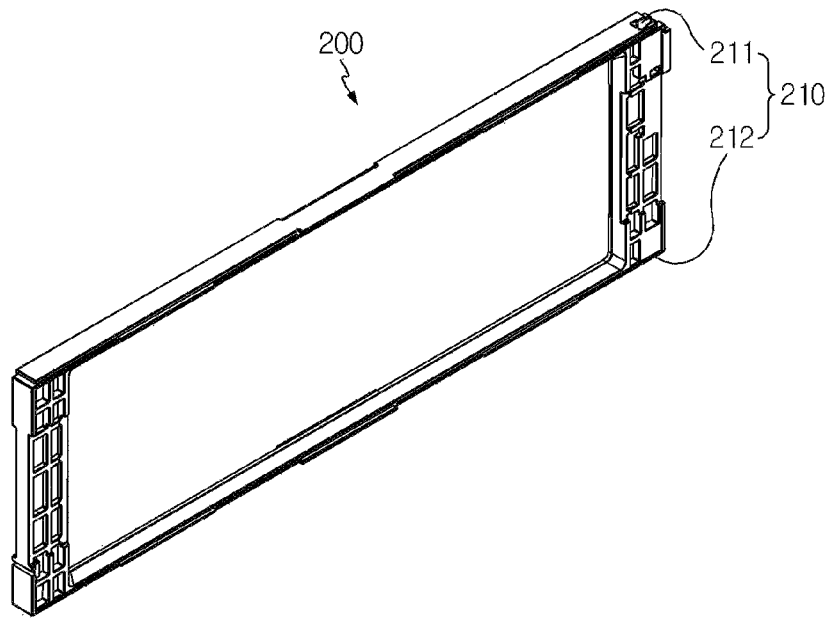
FIG. 6 is a perspective view schematically showing a cartridge according to another embodiment of the present disclosure.

FIG. 6 is a perspective view schematically showing a cartridge according to another embodiment of the present disclosure.

The cartridge depicted in FIG. 6 is substantially identical to the cartridge depicted in FIG. 5, except for the location of the coupling groove 210. In other words, the cartridge depicted in FIG. 5 has the coupling grooves 210 at upper and lower portions of the front end and does not have the coupling groove 210 at upper and lower portions of the rear end. Meanwhile, the cartridge depicted in FIG. 6 has coupling grooves 210 at upper and lower portions of the rear end and does not have a coupling groove 210 at upper and lower portions of the front end.

In particular, in an embodiment of the present disclosure, the cartridge as shown in FIG. 6 and the cartridge as shown in FIG. 5 may be alternately arranged in at least a partial portion of the battery module. In other words, when a plurality of cartridges are arranged in a lateral direction, cartridges having coupling grooves 210 at the front end and cartridges having coupling grooves 210 at the rear end may be arranged to be alternately located from the left to the right.

For example, referring to FIG. 1, among the plurality of cartridges included in the battery module and arranged in a lateral direction, all cartridges except for two cartridges located at the outermost positions in the right and left directions may have the coupling grooves 210. At this time, each cartridge having the coupling groove 210 may have the coupling groove 210 formed at just one of the front end and the rear end. In addition, cartridges having coupling grooves 210 at the front end and cartridges having coupling grooves 210 at the rear end may be arranged so that different kinds of cartridges are arranged adjacent to each other and the same kind of cartridges are not arranged adjacent to each other. For example, as shown in FIG. 1, cartridges may be stacked from a left side of the battery module to a right side thereof in the following order: a cartridge having a coupling groove 210 at the rear end, a cartridge having a coupling groove 210 at the front end, a cartridge having a coupling groove 210 at the rear end, a cartridge having a coupling groove 210 at the front end, . . . .

In this embodiment of the present disclosure, the housing and the cartridge 200 may be coupled with uniform force at both the front end and the rear end of the battery module, and it is possible to prevent the coupling force between the housing and the cartridge 200 from being weakened at any one of the front end and the rear end of the battery module. In addition, in this embodiment of the present disclosure, the coupling structure using the coupling protrusion 310 and the coupling groove 210 may be applied to most of the cartridges 200 so that the stacking structure of the cartridges 200 may be stably maintained, and also a distance between the coupling protrusions 310 may be ensured over a certain level so that the housing has a simple structure and also the housing and the cartridges 200 may be assembled easily.

Also preferably, as shown in FIG. 2, an electrode lead 101 of each pouch-type secondary battery 100 may be provided to at least one of the front end and the rear end of the cartridge 200 to protrude forwards or rearwards. In addition, such pouch-type secondary batteries 100 need to be electrically connected to each other in series or in parallel.

For this, the housing may have a bus bar 320 therein. In addition, if the housing is coupled to the cartridge 200, the bus bar 320 may be electrically connected to the electrode lead 101. For example, as shown in FIG. 2, the lower housing 302 may have a bus bar 320 formed on an inner side of an upper portion thereof to protrude upwards. In addition, if the lower housing 302 is coupled from a lower portion of the front end of the cartridge 200 to an upper portion thereof, the bus bar 320 of the lower housing 302 may contact the electrode lead 101 located at the front end of the cartridge 200. At this time, the bus bar 320 may electrically connect the electrode leads 101 to each other in series or in parallel.

In addition, the housing may have a module terminal 340 at an outer side thereof, so that the battery module is electrically connected to another battery module or other external device. For example, as shown in FIG. 2, the upper housing 301 may have a module terminal 340 formed on at least one side to protrude upwards. In addition, the module terminal 340 may be electrically connected to the bus bar 320 to serve as a charging/discharging terminal of the secondary battery, namely a positive electrode terminal or a negative electrode terminal.

In this embodiment of the present disclosure, the housing may play a role of stably maintaining a stacking structure of the plurality of cartridges 200 and also play a role of electrically connecting secondary batteries to each other and providing external electrode terminals thereto. Therefore, components for fixing stacked cartridges 200, electrically connecting secondary batteries or providing module terminals may not be separately provided, in addition to the housing.

In addition, the housing may have a connector terminal 330 for sensing a voltage of the pouch-type secondary battery and transmitting the sensed information. For example, as shown in FIG. 2, the housing may have a connector terminal 330 provided to at least one side so that a connected may be coupled thereto from an upper portion of the side to a lower portion thereof. In addition, the connector terminal 330 may be electrically connected to the bus bar 320 to sense voltages at both ends of at least one secondary battery, the sensed information may be transmitted outwards through the connector terminal 330. For example, a connector of an external device out of the battery module, for example a battery management system (BMS) may be connected to the connector terminal 330, and the sensed information may be transmitted to the external device by means of this connection.

Meanwhile, in the battery module according to an embodiment of the present disclosure, the pouch-type secondary battery may be at least partially adhered and fixed to the cartridge 200 by means of an adhesive.

For example, as indicated by E1 and E1' in FIG. 5, a unit frame of the cartridge 200 located at an upper side and a unit frame thereof located at a lower side may be coated with an adhesive. In addition, when the pouch-type secondary battery is accommodated in the cartridge 200, upper and lower peripheral edges of the pouch-type secondary battery may be adhered and fixed to the cartridge 200, respectively.

In particular, the pouch-type secondary battery may have a rectangular shape. At this time, the peripheral edges of the pouch-type secondary battery may be regarded as having two long sides and two short sides. Here, two long sides of the pouch-type secondary battery may be adhered and fixed to the cartridge 200 by means of an adhesive.

In this embodiment of the present disclosure, since the long sides of the peripheral edges of the secondary battery are adhered and fixed to the cartridge 200, the adhesive force may be further improved. Further, since the electrode lead 101 may protrude on the short sides of the pouch-type secondary battery, it is more preferred that the long sides are coated with an adhesive, rather than that the short sides are coated with an adhesive.

Figure 7:
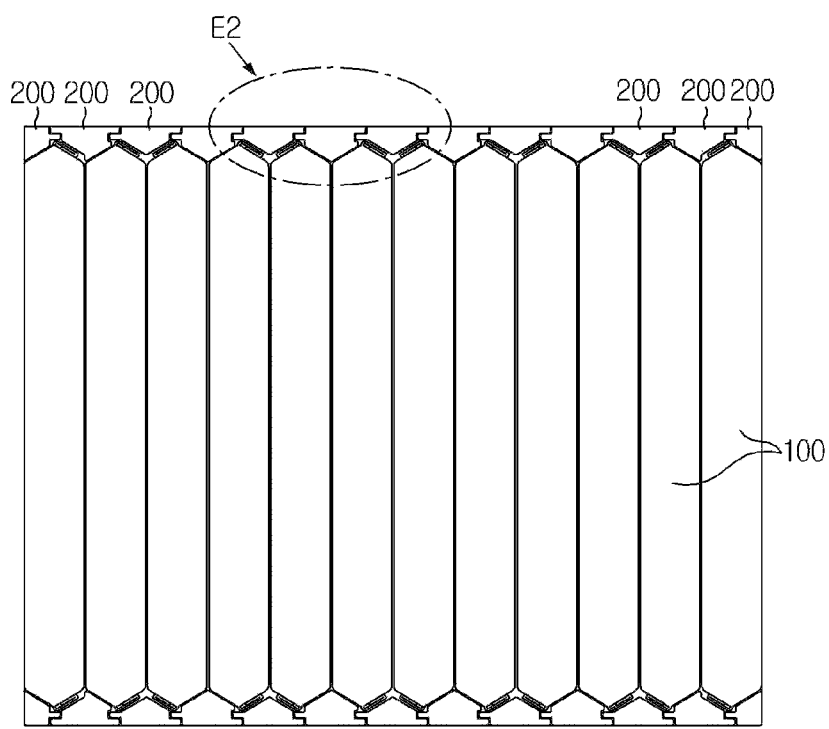
FIG. 7 is a cross-sectional view, taken along the line A1-A1' of FIG. 1.
Figure 8:
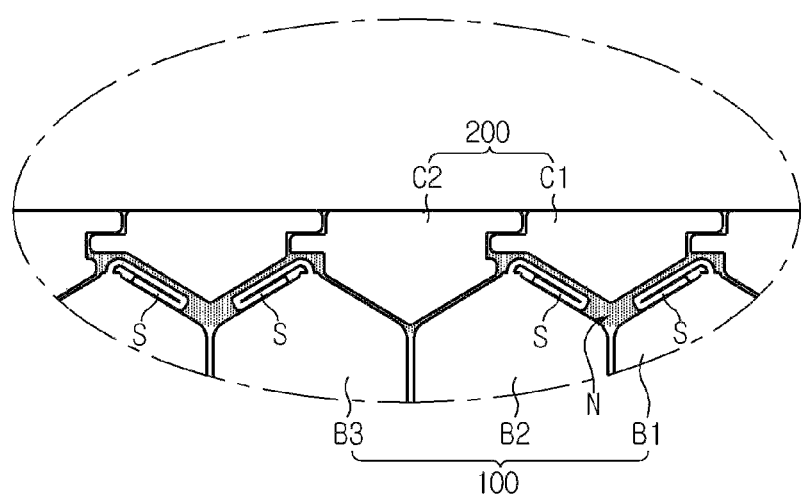
FIG. 8 is an enlarged view showing a portion E2 of FIG. 7.

FIG. 7 is a cross-sectional view, taken along the line A1-A1' of FIG. 1, and FIG. 8 is an enlarged view showing a portion E2 of FIG. 7.

Referring to FIGS. 7 and 8, upper and lower sides of the pouch-type secondary battery 100 may be adhered and fixed to the cartridge 200 by means of an adhesive N. In particular, referring to FIG. 8, the adhesive N may be interposed between the upper side of the secondary battery 100 and the lower side of the cartridge 200 to fix the secondary battery 100 and the cartridge 200 to each other. In addition, similar to FIG. 8, the lower side of the secondary battery 100 may also be adhered and fixed to the upper side of the cartridge 200 by means of an adhesive.

In particular, two pouch-type secondary batteries 100 adjacent to each other may be adhered and fixed to a single cartridge 200. For example, referring to FIG. 8, both a secondary battery B1 and a secondary battery B2 may be adhered and fixed to a cartridge C1. In addition, both a secondary battery B2 and a secondary battery B3 may be adhered and fixed to a cartridge C2.

In this configuration, it may be regarded that two cartridges stacked adjacent to each other in a lateral direction are adhered and fixed by a single pouch-type secondary battery. For example, in FIG. 8, the cartridge C1 and the cartridge C2 may be adhered and fixed to the secondary battery B2 by means of the adhesive N.

In this embodiment of the present disclosure, cartridges may be coupled more firmly. In other words, in the present disclosure, a plurality of cartridges may maintain their stacking state by being coupled to a housing, and as in this embodiment, the cartridges may be coupled and fixed to each other more firmly by means of adhesion using the adhesive N. Therefore, in this embodiment of the present disclosure, even though there is provided no coupling member between cartridges or secondary batteries, a sufficient structural strength may be ensured, and a coupling state may be stably maintained against an impact or vibration.

In this configuration of the present disclosure, the cartridge may be configured so that at least a part of its inner side corresponds to at least a part of an outer side of the pouch-type secondary battery.

For example, as shown in FIG. 8, the secondary battery may be formed so that at least a part of its outer side has a gradually decreasing width in an outward direction. In this case, the cartridge may be formed to correspond to the shape of the outer side of the secondary battery, namely so that at least a part of the inner side of the cartridge has a gradually decreasing width in an inward direction. In particular, the cartridge may have two inclined surfaces at its inner side, and inclined surfaces of different secondary batteries may be placed on adhered to the two inclined surfaces of the cartridge.

In this embodiment of the present disclosure, a contact area between the secondary battery and the cartridge may be increased. Therefore, the secondary battery may be placed on and fixed to the inner side of the cartridge more stably. In addition, more heat may be rapidly transferred from the secondary battery to the cartridge.

In particular, since a pouch-type secondary battery is generally configured to have two inclined surfaces at its outer side, except for a sealing portion, in the above configuration of the present disclosure, an existing secondary battery may be adopted as it is. Therefore, the present disclosure may be implemented without deforming an existing secondary battery greatly. In addition, by increasing a contact area between the secondary battery and the cartridge, it is possible to stably fix the secondary battery, ensure effective cooling performance, and more easily obtain a compact structure of the battery module.

Meanwhile, the pouch-type secondary battery may have a sealing portion S at its rim portion, and at the sealing portion S, two pouches are welded to each other. At this time, the sealing portion S of the secondary battery may be at least partially folded, thereby reducing the entire size of the secondary battery. In particular, as shown in FIGS. 7 and 8, sealing portions S located at upper and lower ends of the pouch-type secondary battery may be folded into the accommodation space of the electrode assembly. In addition, the sealing portions S folded as above may be interposed between the inclined surface at an outer side of the electrode assembly accommodation space formed in the secondary battery and an inner side of the cartridge and adhered and fixed together with them.

In this configuration of the present disclosure, by reducing the space occupied by the sealing portion S, the battery module may have a smaller design in an easier way. In addition, by decreasing a distance between the secondary battery and the cartridge, it is possible to enhance heat transfer efficiency from the secondary battery to the cartridge. In particular, since the cartridge contacts an outer side of the folded sealing portion S and the secondary battery contacts an inner side of the folded sealing portion S, heat in the secondary battery may also be transferred to the cartridge through the folded portion of the sealing portion S.

Preferably, the battery module according to the present disclosure may have a cartridge with a relatively smaller thickness. In addition, the folded sealing portion S may be located at the cartridge with a smaller thickness.

For example, in the configuration of FIG. 8, the cartridge C1 may have a smaller thickness, namely a smaller length in a vertical direction, in comparison to the cartridge C2. In addition, the folded sealing portion S of the secondary battery B1 and the folded sealing portion S of the secondary battery B2 may be adhered and fixed to the cartridge C1.

Further, in this configuration, since all pouch-type secondary batteries may include the folded sealing portions S, in order to accommodate the folded sealing portions S, a thin cartridge such as the cartridge C1 and a thick cartridge such as the cartridge C2 may be arranged alternately.

In this configuration of the present disclosure, even though the sealing portion S of the secondary battery is folded in any one direction between the right and left directions, the battery module may have a uniform width as a whole in a vertical direction. In other words, a plurality of cartridges may be configured to have a straight outer surface as a whole, without protruding or being dented at a specific secondary battery. For example, in the configuration depicted in FIG. 7, all cartridges stacked in a lateral direction may be flat in both upper and lower surfaces.

In the present disclosure, at least a part of the cartridge may be made of thermally-conductive material. A cartridge stacked in an existing secondary battery is generally made of polymer material without thermal conduction, and thus a cooling member is separately provided in many cases since thermal conduction is substantially not performed through the cartridge. However, in the present disclosure, since the cartridge is at least partially made of thermally-conductive material from its inner side to its outer side, heat of the secondary battery may be easily transferred to the outside through the cartridge. Therefore, in the embodiment of the present disclosure, effective cooling performance may be ensured though a cooling member is not separately provided between secondary batteries.

In particular, at least a part of the cartridge may include a thermally-conductive polymer or may be made of a thermally-conductive material containing thermally-conductive filler and polymer.

In other words, the cartridge may be made using a polymer as a main material, instead of general metal or metal alloy. The polymer-based thermally-conductive material is lighter than metal, which allows the battery module to easily have a lighter design, ensures easy molding, low thermal expansion coefficient and low electric conduction, which leads to better electric insulation. In the present disclosure, the material of the cartridge may adopt various kinds of polymer-based thermally-conductive materials known to the public at the time of filing of the present disclosure.

For example, the cartridge may be made of a composite material in which a general polymer is mixed with thermally-conductive fillers. Here, the filler may include silicon compound, aluminum compound, magnesium compound, boron compound or the like. For example, the filler included in the thermally-conductive material may employ silicon oxide, aluminum oxide, boron nitride, aluminum nitride, magnesium oxide, anhydrous magnesium carbonate, magnesium hydroxide or the like. However, the present disclosure is not limited thereto, and various fillers other than the above may also be used as a material of the cartridge.

The polymer used in the cartridge may include various materials such as polypropylene, acrylonitrile butadiene styrene, polycarbonate, nylon, liquid crystal polymer, polyphenylene sulfide, polyetherether ketone or the like. In addition, various polymer materials other than the above may also be used as a material of the cartridge of the present disclosure.

In particular, the thermally-conductive material of the cartridge may have heat conductivity of 1 W/mK or above. For example, this thermally-conductive material may be polymer plastic or rubber with 2 W/mK to 20 W/mK. Further, the thermally-conductive material may have 5 W/mK or above.

In an existing technique, plastic used as a material of a cartridge generally has thermal conductivity of 0.1 W/mK to 0.4 W/mK, which is regarded as having substantially no thermal conductivity. However, since the cartridge according to the present disclosure uses a polymer material having higher thermal conductivity, the cartridge may allow heat transfer and emission. Therefore, in this embodiment of the present disclosure, even though a cooling member such as a metallic cooling plate is not separately provided in the cartridge, heat of the secondary battery may be effectively discharged out through the cartridge.

Further, in an embodiment of the present disclosure, since the secondary battery directly contact the cartridge and is fixed thereto, heat of the secondary battery may be directly transferred to the cartridge without passing through the air. In addition, since a contact portion of the cartridge which contacts the secondary battery is made of thermally-conductive material, the heat transferred to the cartridge may be rapidly discharged out through the cartridge.

Meanwhile, in the battery module according to an embodiment of the present disclosure, at least a part of the plurality of secondary batteries may be configured to make surface contact with each other. For example, as shown in FIG. 7, the plurality of secondary batteries may be arranged so that their broad right and left surfaces, namely outer side surfaces of the inner space where the electrode assembly is accommodated, respectively come into contact with each other.

In an existing battery module, a plate-shaped cooling member made of metal such as aluminum is frequently interposed between secondary batteries for cooling. However, in the battery module according to an embodiment of the present disclosure, the heat generated from a secondary batter may be directly transferred to a cartridge, which contacts the secondary battery, at the sealing portion S of the secondary battery and discharged out. Therefore, in the battery module according to the present disclosure, a cooling member is not interposed between secondary batteries, and the secondary batteries may direct contact each other as in the embodiment.

Therefore, according to this embodiment of the present disclosure, the space occupied by a cooling member may be reduced to easily obtain a smaller design of the battery module, and the battery module may have a simpler structure. Also, manufacturing costs and time may be reduced.

Meanwhile, in the battery module according to an embodiment of the present disclosure, the adhesive for adhering and fixing the cartridge and the secondary battery may employ various kinds of adhesives.

In particular, the adhesive may be a thermally-conductive adhesive. The thermally-conductive adhesive has higher thermal conductivity in comparison to a general adhesive, and thus a heat transfer rate and amount between the secondary battery and the cartridge may be further enhanced. Therefore, in this embodiment of the present disclosure, heat of the secondary battery may be discharged through the cartridge more efficiently cartridge, which results in improved cooling performance of the battery module.

A battery pack according to the present disclosure may include at least one battery module as described above. Moreover, the battery pack according to the present disclosure may further include a pack case for receiving the battery module, various devices for controlling charging/discharging of the battery module, for example a battery management system (BMS), a current sensor, a fuse or the like, in addition to the battery module.

The battery module according to the present disclosure may be applied to a vehicle such as an electric vehicle or a hybrid electric vehicle. In other words, the vehicle according to the present disclosure may include the battery module as described above.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, if the terms indicating up, down, left and right directions are used in the specification, it is obvious to those skilled in the art that these merely represent a relative location and may vary based on a location of an observer or a shape in which an object is placed.

What is claimed is:

1. A battery module, comprising:
  a plurality of pouch-type secondary batteries arranged in a lateral direction to stand in a vertical direction;
  a plurality of cartridges configured to accommodate the pouch-type secondary batteries in an inner space thereof, the cartridges being stacked in the lateral direction; and a housing provided to front and rear ends of the cartridges along a longitudinal direction and coupled and fixed to at least two cartridges, wherein at least upper surfaces and lower surfaces of each of the cartridges are not covered by the housing; and wherein the longitudinal direction is perpendicular to the lateral direction.

2. The battery module according to claim 1, wherein the housing includes:

an upper housing coupled and fixed to an upper portion of at least one of front and rear ends of the cartridge; and a lower housing coupled and fixed to a lower portion of at least one of front and rear ends of the cartridge.

3. The battery module according to claim 2, wherein the upper housing and the lower housing are coupled and fixed to each other by hooking.

4. The battery module according to claim 2, wherein coupling holes are formed in the upper housing and the lower housing in a vertical direction, and a coupling member is inserted through both the coupling holes.

5. A battery module, comprising:

a plurality of pouch-type secondary batteries arranged in a lateral direction to stand in a vertical direction;

a plurality of cartridges configured to accommodate the pouch-type secondary batteries in an inner space thereof, the cartridges being stacked in the lateral direction; and a housing provided to at least one of front and rear ends of the cartridges and coupled and fixed to at least two cartridges, wherein the housing has a coupling protrusion formed at an inner side, which is coupled to the cartridges, to protrude inwards, at least two cartridges among the plurality of cartridges have coupling grooves formed in outer sides to have a shape corresponding to the coupling protrusion, and the housing is coupled to the cartridges by inserting the coupling protrusion into the coupling groove, and wherein the coupling protrusion has a portion which becomes thicker closer to the cartridge, the coupling groove has a portion which becomes wider further from the outer side, and the coupling protrusion is slidably coupled into the coupling groove in a vertical direction.

6. The battery module according to claim 5, wherein in at least two cartridges among the plurality of cartridges, the coupling grooves are respectively formed to a predetermined depth in a vertical direction at both upper and lower ends of the cartridges.

7. The battery module according to claim 5, wherein at least a part of the plurality of cartridges has the coupling groove only at a front or rear end thereof.

8. A battery module, comprising:

a plurality of pouch-type secondary batteries arranged in a lateral direction to stand in a vertical direction;

a plurality of cartridges configured to accommodate the pouch-type secondary batteries in an inner space thereof, the cartridges being stacked in the lateral direction; and a housing provided to at least one of front and rear ends of the cartridges and coupled and fixed to at least two cartridges, wherein the housing has a coupling protrusion formed at an inner side, which is coupled to the cartridges, to protrude inwards, at least two cartridges among the plurality of cartridges have coupling grooves formed in outer sides to have a shape corresponding to the coupling protrusion, and the housing is coupled to the cartridges by inserting the coupling protrusion into the coupling groove, wherein at least a part of the plurality of cartridges has the coupling groove only at a front or rear end thereof, and wherein cartridges having coupling grooves formed only at front ends thereof and cartridges having coupling grooves only at rear ends thereof are arranged alternately.

9. The battery module according to claim 1, wherein the housing is provided to both front and rear ends of the cartridge.

10. The battery module according to claim 1, wherein an electrode lead of the pouch-type secondary battery is provided to at least one of front and rear ends of the cartridge, and wherein the housing includes a bus bar located at an inner side thereof to electrically contact the electrode lead, and a module terminal formed to protrude on an outer side thereof and electrically connected to the bus bar.

11. The battery module according to claim 10, wherein the housing includes a connector terminal configured to sense a voltage of the pouch-type secondary battery and transmit the sensed information to the outside.

12. The battery module according to claim 1, wherein at least a part of the pouch-type secondary battery is adhered and fixed to the cartridge by means of an adhesive.

13. The battery module according to claim 12, wherein two pouch-type secondary batteries adjacent to each other are adhered and fixed to a single cartridge.

14. The battery module according to claim 1, wherein at least a part of the cartridge includes a thermally-conductive polymer or includes a thermally-conductive material containing thermally-conductive filler and polymer.

15. A battery pack, comprising: the battery module defined in claim 1.

16. A vehicle, comprising: the battery module defined in claim 1.

17. A battery pack, comprising: the battery module defined in claim 5.

18. A battery pack, comprising: the battery module defined in claim 8.

* * * * *